(12) United States Patent
Amitai et al.

(10) Patent No.: US 9,209,897 B2
(45) Date of Patent: Dec. 8, 2015

(54) ADAPTIVE FORWARD ERROR CORRECTION IN PASSIVE OPTICAL NETWORKS

(75) Inventors: Assaf Amitai, Tel Aviv (IL); David Avishai, Nes Ziona (IL); Eli Elmoalem, Nili (IL)

(73) Assignee: Broadcom Corporation, Irvine, CA (US)

( * ) Notice: Subject to any disclaimer, the term of this patent is extended or adjusted under 35 U.S.C. 154(b) by 496 days.

(21) Appl. No.: 13/331,255

(22) Filed: Dec. 20, 2011

(65) Prior Publication Data

US 2013/0156420 A1   Jun. 20, 2013

(51) Int. Cl.
H04B 10/079 (2013.01)
H04B 10/50 (2013.01)
H04B 10/272 (2013.01)
H04L 1/00 (2006.01)
H04L 1/20 (2006.01)

(52) U.S. Cl.
CPC ........ H04B 10/07953 (2013.01); H04B 10/272 (2013.01); H04B 10/5055 (2013.01); H04L 1/0009 (2013.01); H04L 1/0025 (2013.01); H04L 1/20 (2013.01); H04L 2001/0093 (2013.01)

(58) Field of Classification Search
None
See application file for complete search history.

(56) References Cited

U.S. PATENT DOCUMENTS

| | | | | |
|---|---|---|---|---|
| 5,699,365 | A * | 12/1997 | Klayman et al. | 714/708 |
| 7,920,791 | B2 | 4/2011 | Sakai et al. | |
| 8,005,362 | B2 | 8/2011 | Sakamoto et al. | |
| 2010/0189433 | A1 | 7/2010 | Trojer | |
| 2010/0296811 | A1* | 11/2010 | Ohira et al. | 398/72 |
| 2010/0316381 | A1* | 12/2010 | de Lind van Wijngaarden | 398/58 |
| 2011/0142437 | A1 | 6/2011 | Luo et al. | |
| 2011/0246861 | A1* | 10/2011 | Khermosh | 714/776 |
| 2011/0293274 | A1 | 12/2011 | Sakamoto et al. | |

OTHER PUBLICATIONS

International Telecommunication Union (ITU), ITU-T G.984.3; Series G: Transmission Systems and Media, Digital Systems and Networks; Gigabit-capable Passive Optical Networks (GPON): Transmission convergence layer specification; Mar. 2008; Chapter 8, pp. 36-50.

(Continued)

*Primary Examiner* — Ken Vanderpuye
*Assistant Examiner* — Merlin Brito Peguero
(74) *Attorney, Agent, or Firm* — Sterne, Kessler, Goldstein & Fox P.L.L.C.

(57) ABSTRACT

A method for an adaptive forward error correction (FEC) in a passive optical network. The method comprises selecting an initial downstream FEC code to be applied on downstream data transmitted from an optical line terminal (OLT) to a plurality of optical network units (ONUs) of the PON; communicating the selected downstream FEC code to the plurality of ONUs; receiving at least one downstream bit error ratio (BER) value from at least one ONU of the plurality of ONUs, wherein the downstream BER value is measured respective to downstream data received at the at least one ONU; changing the selected downstream FEC code to a new downstream FEC code based on a plurality of downstream BER values measured by the at least one ONU; and communicating the new downstream FEC code to the plurality of ONUs.

17 Claims, 4 Drawing Sheets

(56) References Cited

OTHER PUBLICATIONS

International Telecommunication Union (ITU), ITU-T G.987.3; Series G: Transmission Systems and Media, Digital Systems and Networks; 10-Gigabit-capable passive optical networks (XG-PON): Transmission convergence (TC) specifications; Oct. 2010; Chapters 8-9, pp. 25-39.

International Telecommunication Union (ITU), ITU-T G.987.2; Series G: Transmission Systems and Media, Digital Systems and Networks; 10-Gigabit-capable passive optical networks (XG-PON): Transmission convergence (TC) specifications; Oct. 2010; Section 9.2, pp. 4-16.

International Telecommunication Union (ITU), ITU-T G.987 Series G: Transmission Systems and Media, Digital Systems and Networks; 10-Gigabit-capable passive optical networks (XG-PON): Transmission convergence (TC) specifications; Oct. 2010; Sections 5.2-5, pp. 12-14.

International Telecommunication Union (ITU), ITU-T G.988 Series G: Transmission Systems and Media, Digital Systems and Networks; 10-Gigabit-capable passive optical networks (XG-PON): Transmission convergence (TC) specifications; Oct. 2010; section 11.2.4, pp. 369-376.

\* cited by examiner

ADAPTIVE FORWARD ERROR CORRECTION IN PASSIVE OPTICAL NETWORKS

TECHNICAL FIELD

The present invention relates generally to passive optical networks (PONs), and more specifically for performing adaptive forward error correction (FEC) in PONs.

BACKGROUND OF THE INVENTION

A passive optical network (PON) comprises an optical line terminal (OLT) connected to multiple optical network units (ONUs) in a point-to-multi-point network. New standards have been developed to define different types of PONs, each of which serves a different purpose. For example, the various PON types known in the related art include a Broadband PON (BPON), an Ethernet PON (EPON), a Gigabit PON (GPON), a ten-Gigabit PON (XG-PON), and others.

An exemplary diagram of a typical PON 100 is schematically shown in FIG. 1. The PON 100 includes N ONUs 120-1 through 120-N (collectively known as ONUs 120) coupled to an OLT 130 via a passive optical splitter 140. In a XG-PON, for example, traffic data transmission is achieved using XGPON encapsulation method (XGEM) encapsulation over two optical wavelengths, one for the downstream direction and another for the upstream direction. Thus, downstream transmission from the OLT 130 is broadcast to all the ONUs 120. Each ONU 120 filters its respective data according to pre-assigned labels (e.g., XGEM port-IDs). A similar traffic data transmission technique is also utilized in GPON.

The splitter 140 is 1 to N splitter, i.e., capable of distributing traffic between a single OLT 130 and N ONUs 120. In most PON architectures, the upstream transmission is shared between the ONUs 120 in a TDMA based access, controlled by the OLT 130. TDMA requires that the OLT first discovers the ONUs and measures their round-trip-time (RTT), before enabling coordinated access to the upstream link. Each ONU 120 is equipped with a BER measurement unit 122.

In order to provide reliable data communication forward error correction (FEC) is applied on the data frames transmitted by the OLT in the downstream direction and frames transmitted by the ONUs in the upstream direction. A FEC is a well-known technique in data communication for correcting errors in data transmission over unreliable or noisy communication channels. A FEC is accomplished by adding redundancy (parity) bytes to the transmitted data using a code. Examples for FEC coding techniques include, for example, Reed-Solomon (RS), Bose and Ray-Chaudhuri (BCH), low-density parity-check (LDPC) coding, and the like.

The utilization of FEC in a GPON is optional. However, when in use, only a Reed-Solomon RS(255,239) code is permitted. The length (size) of the data section of each FEC codeword is 239 bytes, and the number of parity bytes of this codeword is 16 bytes. A GEM frame's structure is defined in the GPON standard ITU-T G.984.3, referenced herein for the useful understanding of the background.

FIG. 2 illustrates an XG-PON1 downstream physical (PHY) frame 200 that includes a physical synchronization block (PSBd) portion 210, a XGPON transmission convergence layer (XGTC) header 220, and a XGTC payload 230. The duration of a downstream PHY frame 200 is 125 microsecond.

The PSBd 210 defines certain provisions for the transmission of the downstream PHY frame 200. The XGTC header 220 includes a predefined number of bandwidth (BW) maps 221 and physical layer operations and maintenance (PLOAM) messages 222. The XGTC header 220 also includes a HLend field 223, which designates the number of BW maps and PLOAMs for the current frame.

In the downstream direction, the XGTC payload 230 includes a plurality of XGEM frames 231, each includes a XGEM header and payload. The XGTC header 220, and a XGTC payload 230 are coded using the RS(248, 216) code, with a data codeword of 216 bytes and 32 parity bytes. The structures of XGEM frame and XG-PON1 downstream PHY frame are specified in the XGPON standard ITU-T G.987.3, referenced herein for the useful understanding of the background.

In the upstream direction, XGEM frames can be transmitted to the OLT either as FEC-enabled burst series or a FEC-disabled burst series. In the FEC-enabled mode, data is FEC coded using the RS(248, 232) code. The determination of whether the upstream burst should be FEC-enabled is performed by the OLT. The OLT informs the ONUs of the selected mode (FEC enabled/disabled) using a profile downstream PLOAM message. This message associates, among other parameters, a FEC enabled/disabled parameter to every burst profile. When the OLT sends bandwidth allocation structures to the ONU, each bandwidth grant carries, among other parameters, a reference to one of the defined burst profiles, thus mandating whether FEC is used in each burst transmission by each ONU. The XG-PON standard specifics that when the FEC is enabled, an ONU can encode the transmitted burst data only using the RS(248,232) code.

The FEC correction code permitted to be utilized is according to the maximum bit error ratio (BER) that can be tolerated. Specifically, physical media dependent layer (PMD) parameters specified in ITU-T G.987.2, section 9.2, are defined relative to a bit error rate (BER) of $10^{-3}$ in the downstream direction and $10^{-4}$ in the upstream direction. The PMD parameters include, among others, permitted ODN (optical distribution network) attenuation range, maximum fiber distance, line codes, masks of transmitter eye diagrams, minimum and maximum mean launched power, minimum extinction ratio, minimum receiver sensitivity, and more. Thus, when the values set to these parameters are met, the resulting BER is expected to be bounded by $10^{-3}$ in the downstream direction or $10^{-4}$ in the upstream direction. However, these error rates are not acceptable for a reliable data link, therefore a FEC is needed.

The BER level at the output of the FEC decoder (that is, after FEC correction is applied), is specified by XG-PON standard ITU-T G.987, section sections 5.2-5, to be $10^{-12}$ or better. The FEC code specified by the respective standard can be used to bridge the gap between the BER provided by the PMD layer and the BER required by the upper layers of the XG-PON or GPON protocol.

The single FEC code, specified by the above-referenced standards, defined based on a theoretical network with a typical number of ONUs and specific conditions on the optical fiber. However, this limits the bandwidth utilization and reliability of the network. For example, in an XG-PON deployment where a small number of ONUs are installed and the range between the OLT to the ONUs is relatively short, less restricted FEC codes can be utilized where less parity bytes are transmitted. Thus, increasing the bandwidth utilization. On the other hand, when the fiber conditions are degraded, either permanently as a result of an intentional assumptions taken in the course of the network design, e.g., installation of a large number of ONUs, having a long distance between the OLT and ONUs, and/or using poor quality optical components, or temporarily, e.g., due to construction work in the fiber vicinity, inclement weather conditions, performance degradation due to aging, or physical damage to the ODN, a stronger FEC code should be used to improve transmission reliability.

It would be therefore advantageous to provide a solution for adaptively selecting and applying the FEC to improve the efficiency of the PON.

SUMMARY OF THE INVENTION

Certain embodiments include herein include a method for an adaptive forward error correction (FEC) in a passive optical network. The method comprises selecting an initial downstream FEC code to be applied on downstream data transmitted from an optical line terminal (OLT) to a plurality of optical network units (ONUs) of the PON; communicating the selected downstream FEC code to the plurality of ONUs; receiving at least one downstream bit error ratio (BER) value from at least one ONU of the plurality of ONUs, wherein the downstream BER value is measured respective to downstream data received at the at least one ONU; changing the selected downstream FEC code to a new downstream FEC code based on a plurality of downstream BER values measured by the at least one ONU; and communicating the new downstream FEC code to the plurality of ONUs.

Certain embodiments include herein also include an apparatus implemented in an optical line terminal (OLT) configured to perform an adaptive forward error correction (FEC) in a passive optical network. The method comprises a processor for at least setting a downstream FEC code based on a plurality of measured downstream BER values and setting for an optical network unit (ONU) in the PON an upstream FEC mode and an upstream FEC code based on a measured upstream BER value; a FEC encoder/decoder for FEC encoding data using the downstream FEC code and for FEC decoding upstream burst data received from an ONU based on its respective upstream FEC code; a BER measurement unit for measuring an upstream BER value for the ONU; and a memory for storing a list of FEC codes that can be set for the upstream FEC code and the downstream FEC code, wherein the memory also stores an upstream FEC code and an upstream FEC mode set for the ONU.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

Figure 1:
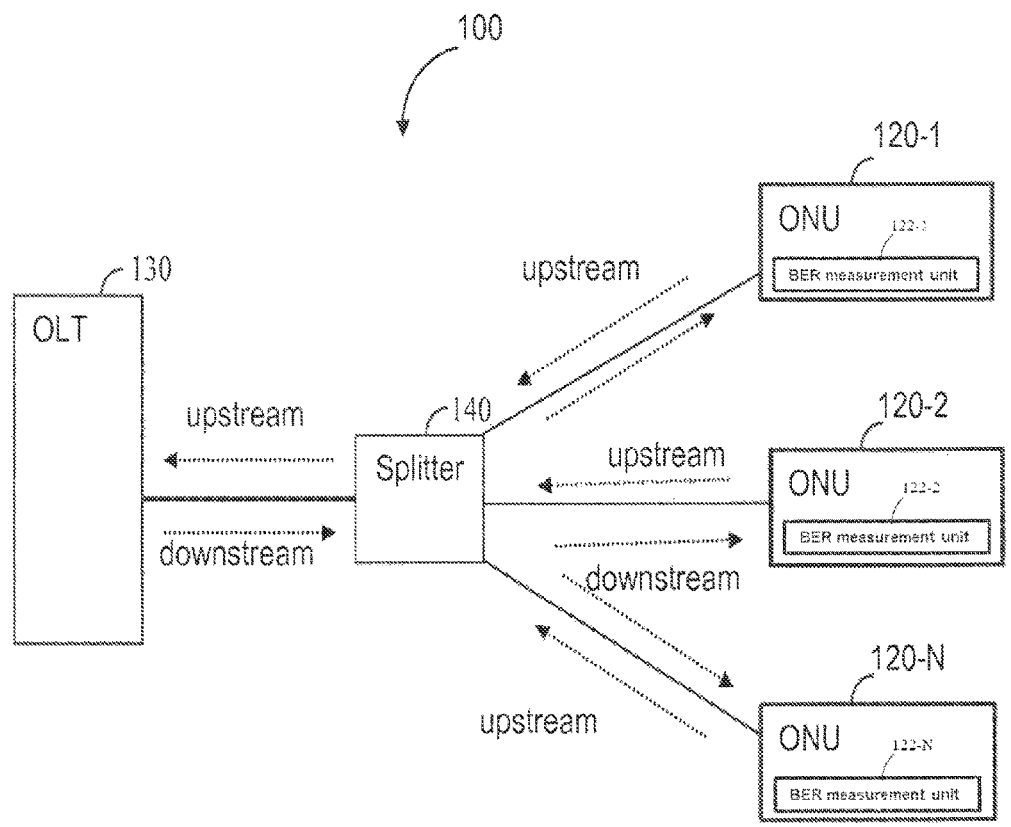
FIG. 1 is a schematic diagram of a PON.
Figure 2:
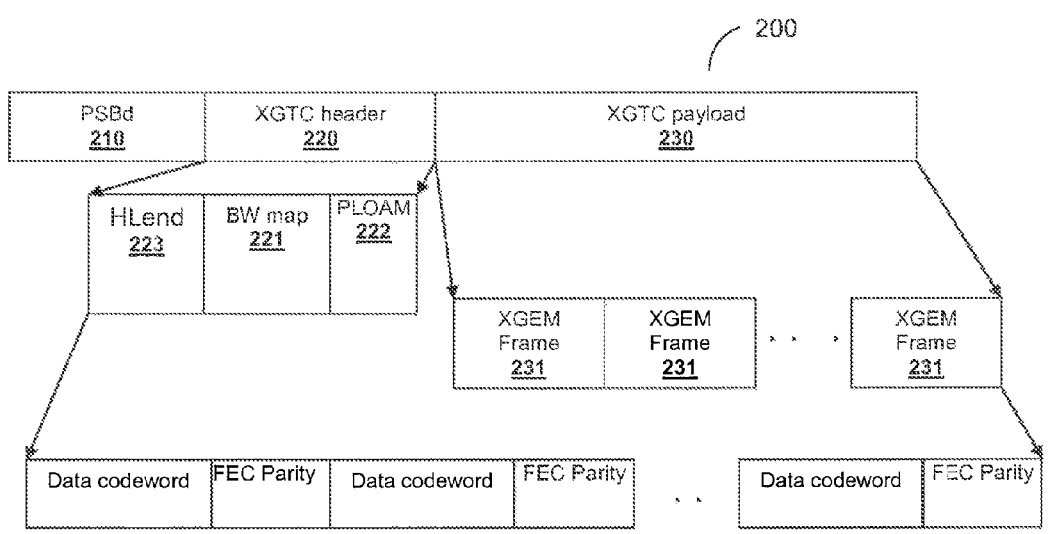
FIG. 2 shows a structure of a XG-PON1 downstream physical (PHY) layer frame.

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
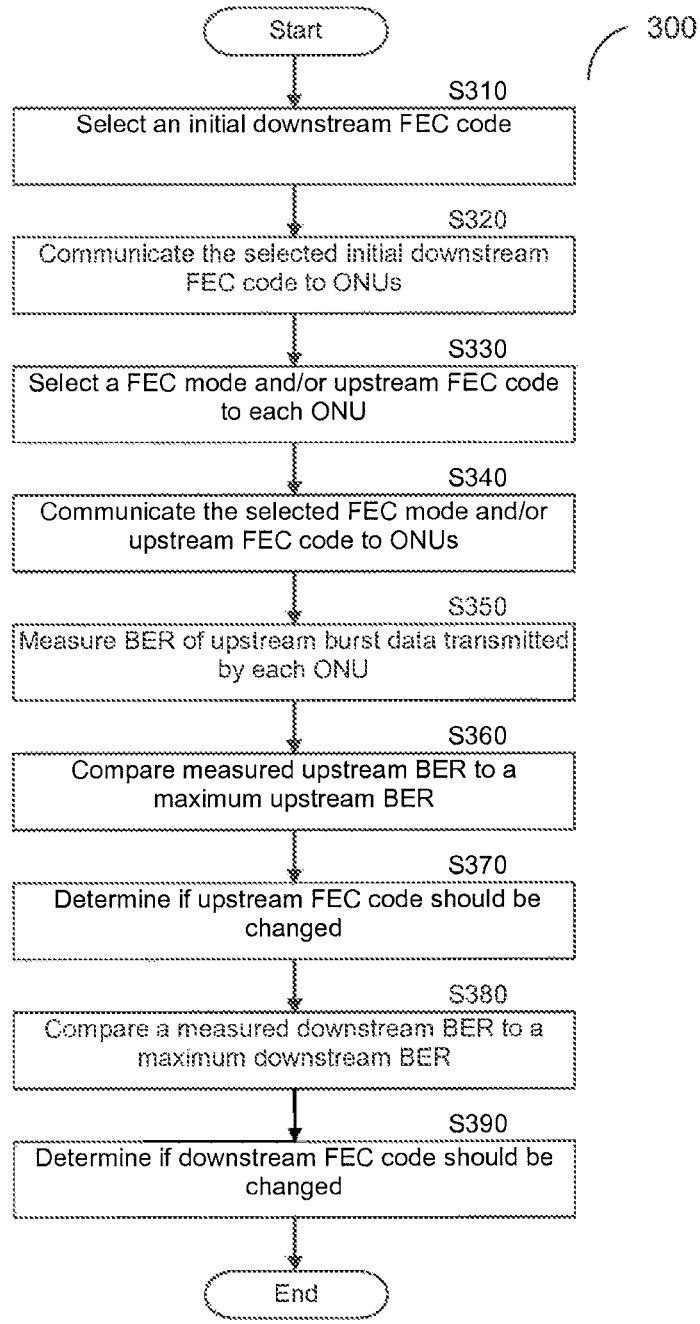
FIG. 3 shows a flowchart illustrating a method for an adaptive FEC in accordance with an embodiment of the invention.

FIG. 3 shows an exemplary and non-limiting flowchart 300 illustrating the method for an adaptive FEC in accordance with one embodiment of the invention. The method is performed by an OLT in a PON. In an embodiment of invention, the PON may be a XG-PON or a GPON in which a FEC is permitted. The method selects the optimal FEC code in at least one of the downstream and upstream directions to optimize at least the transmission bandwidth and/or reliability of the PON. The FEC codes selected for the downstream and upstream directions do not be the same. Further, the FEC codes may be set differently for different ONUs in the PON.

The FEC codes that can be selected by the method may be, but are not limited to, Reed-Solomon (RS), BCH, LDPC coding, and the like. Thus, the method may utilize FEC codes other than the FEC code defined in the GPON and XG-PON respective standards. In one embodiment, the OLT is pre-configured with a set of FEC codes that can be used in the upstream and downstream direction in different scenarios. The FEC codes include, but are not limited to, RS(248,232) (truncated from RS(255,239)), RS(248,240) (truncated from RS(255,247)), RS(248,216) (truncated from RS(255,223)), RS(248,200) (truncated from RS(255,207)), BCH or LDPC codes of different parameters, and the like. A concatenation of different codes can also be used in order to provide multiple advantageous benefits available from such usage.

At S310, a FEC code to be applied in the downstream direction is selected. The selection initially based, in part, on the PON topology, that is, the number of ONUs, the distance between the ONUs to the OLT, number of splitters, split ratio to ONUs, quality of the optical fibers and various system components, and the like. This information may be provided by the network operator.

The FEC code is selected to maximize the bandwidth utilization in the downstream direction while meeting the BER requirements specified in the GPON or XG-PON standards. In an exemplary implementation, a weaker FEC code is selected for a network with a small number of ONUs, for example eight ONUs per OLT, and/or a short distance between the OLT to ONUs, for example not more than 10 km between the OLT and the farthest ONU. If the PON covers a long distance with many ONUs, a stronger FEC code is utilized.

A weaker FEC code can correct fewer errors than a stronger FEC code. However, the latter code consumes more bandwidth than the formed code as more parity bytes are needed. As a non-limiting example, with the mandatory downstream FEC code is RS(248, 216), 20064 bytes out of 155520 bytes transmitted in a 125 us PHY downstream frame (almost 13%) are parity bytes dedicated for FEC. However, if XG-PON typology is a "compact network" (e.g., a small number of ONUs, short distances, etc.) a weaker code, such as RS(248, 240) can be utilized. This allows reuse of 15048 bytes in every 125 us, thus reducing the FEC overhead to about 3% and increasing the bandwidth in 10%. It should be noted that in certain cases, when network topology conditions permit, the method can select not to apply any FEC in the downstream direction.

At S320, the selected FEC code (if any) is communicated to the ONUs. In one embodiment, the OLT (e.g., OLT 130, FIG. 1) periodically sends in-band handshake messages to the ONUs (e.g., ONUs 120, FIG. 1) in the downstream direction. Each ONU passively monitors the downstream signal (including the handshake message) before initial downstream synchronization is attained to learn the type of FEC code being currently utilized for the downstream direction. The type of downstream FEC code allows the ONU to properly decode the received data frame. As the downstream signal is monitored before the FEC correction, a high bit error ratio is expected. In order to overcome the bit errors, the selected FEC code is identified several times and a majority vote is taken on the results. The in-band handshake signal is further protected by its own error correcting code (e.g. using a BCH code) and only error free samples of the handshake are used for the majority vote process.

At S330, for each ONU, it is determined whether a FEC in the upstream direction should be enabled, and if so a FEC code is selected for each ONU having FEC-enabled. The determination of the FEC code selection is based, in part, on the distance of an ONU from the OLT, the number of splitters and split ratio between the ONU and the OLT, and the quality of the optical fiber. It should be emphasized, that different FEC codes can be selected to different ONUs. For example, if the ONU is located close to the OLT, then a weaker FEC code is selected. However, if the ONU is located farther, then a stronger FEC code is selected. The selected FEC code may be different than the upstream FEC code RS(248, 232) defined in the XG-PON. A stronger FEC is desired in order to provide a larger coding gain, compensating for the increased bit error rate introduced by the optical distribution network. A weaker FEC allows for more efficient transmission reserving more bandwidth for user traffic instead of wasting such bandwidth on overheads.

Once the FEC codes and FEC upstream mode (enabled/disabled) are selected, at S340, this information is communicated to the ONUs by the OLT. This can be performed by sending, for example, a vendor specific downstream ONU management and control interface (OMCI) message (as defined in ITU-T G.988 section 11.2.4), or a downstream unicast PLOAM message. In XG-PON, the FEC enabled/disabled mode for each of ONU can be conveyed to the ONU through a PLOAM messages as defined in the ITU-T G.987.3 standard referenced above.

Once the upstream and downstream FEC codes are selected and communicated to the ONUs, downstream and upstream links are established. Thereafter, data frames are transmitted in the upstream and downstream directions and the OLT continuously assesses the performance of the selected downstream FEC code and each of the upstream FEC codes. It should be noted that regardless of the selected downstream and upstream FEC codes, the length and structure of each of the XGEM frame, XG-PON1 downstream PHY frame, and XG-PON1 upstream PHY frame is always as specified in the XGPON standard ITU-T G.987.3 referenced above, with the exception of the FEC data/parity ratio within the frame. The same is true for GEM frames and GPON downstream/upstream frames defined in the GPON standard ITU-T G.984.3 referenced above.

Specifically, at S350, the OLT measures the BER of upstream burst data transmitted by each ONU. At S360, the measured upstream BER is compared to a maximum upstream BER and/or to previous measured upstream BER values. It should be noted that the maximum upstream BER is defined by the PON communication standard or the network operator. At S370, based on the measured upstream BER it is determined if the currently upstream FEC code should be changed, enabled or disabled. For example, if the measured upstream BER is higher than the maximum upstream BER, then a stronger FEC code can replace the current FEC code. If the measured upstream BER has improved, then a weaker FEC code can replace the current FEC code or alternatively the FEC is disabled. When a decision has been made to replace the upstream FEC code, the new FEC code is communicated to the respective ONU as discussed at S340.

Each ONU also measures downstream BER of the received data frames. For example, BER measurement unit 122-1 in ONU 120N measures downstream BER of the received data frames. This measured value is communicated to the OLT using an upstream PLOAM message. Alternatively, the measured value can be sent by generating an attribute value change (AVC) by the ONU, thus informing the OLT that a new value should be read using OMCI. Alternatively, this value is periodically polled by the OLT using the PLOAM or the OMCI channel.

At S380, the measured downstream BER is compared to a maximum downstream BER and/or to one or more previously measured downstream BER values. At S390, based on the measured downstream BER it is determined if the currently used FEC code should be changed, enabled or disabled. As discussed above, a weaker FEC code is selected if the BER has improved; or otherwise a stronger FEC code can be used to replace the current FEC code when the BER has degraded. When a decision has been made to replace the downstream FEC code, the new FEC code is communicated to the ONUs as discussed at S320.

It should be noted that the determination of whether the upstream/downstream FEC codes should be replaced may be performed after computing an average value of a number of upstream/downstream BER measurements. This allows making an accurate decision with regard to the new FEC codes.

Figure 4:
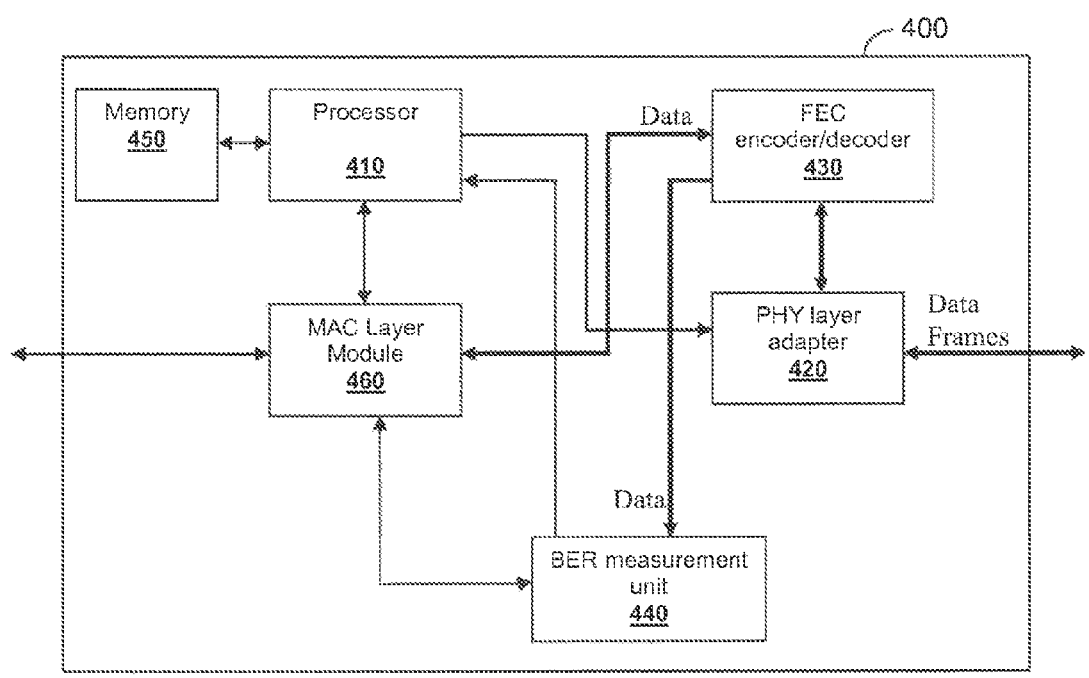
FIG. 4 is a schematic block diagram of an apparatus implemented in an OLT and configured to perform an adaptive FEC according to one embodiment.

FIG. 4 shows an exemplary diagram block diagram of an apparatus 400 implemented in an OLT for adaptively setting the FEC codes according to one embodiment. The apparatus 400 comprises a processor 410, a physical (PHY) layer adapter 420, a FEC encoder/decoder 430, a BER measurement unit 440, a memory 450, and a MAC layer module 460.

The processor 410, among other tasks, sets the FEC code for the FEC encoder/decoder 430 according to the process described in detail above. To this aim, the memory 450, in an embodiment, is a non-transitory computer readable medium having stored thereon instructions for causing the processor to perform the adaptive FEC process. The memory 450 also includes a list of FEC codes that can be utilized by the FEC encoder/decoder 430. The PHY layer adapter 420, FEC encoder/decoder 430, and MAC layer module 460, operate under the control of the processor 410. In one embodiment the PHY layer adapter 420 and MAC layer module 460 are compliant with any one of a GPON or XG-PON communication network.

The MAC layer module 460 is the source and sink of GEM or XGEM frames before and after such frames are being processed by the FEC encoder/decoder 430. The MAC layer module 460 also constructs the synchronization information, e.g., the PLOAM message, according to upstream FEC provisions set by the processor 410. As mentioned above, the FEC provisions include which of the ONUs should be FEC enabled and the FEC code to be utilized by each FEC-enabled ONU and determined by the processor 410.

The PHY layer adapter 420 generates the downstream physical frame, e.g., a XG-PON1 downstream PHY frame (frame 200), according to the provisions set by the processor 410. The data codewords and the parity bytes in the payload section in the downstream physical frame are encoded by the FEC encoder/decoder 430 according the FEC code set by the processor 410. The PHY layer adapter 420 structures the downstream physical frame to include data and parity bytes as provided by the FEC encoder/decoder 430.

It should be noted that regardless of the downstream FEC code selected by the processor 410, the length and structure of a XGEM frame and XG-PON1 downstream frame is as specified in the XGPON standard ITU-T G.987.3 referenced above. The same is true for GEM frames and GPON downstream frames defined in the GPON standard ITU-T G.984.3 referenced above.

The BER measurement unit 440 measures the BER of data frames received from the ONUs. The BER measurements are utilized by the processor 410 to determine if the current upstream FEC code should be changed as described in detail above. Frames received from the ONUs are disassembled by the PHY layer adapter 420 and are FEC decoded by means of the FEC encoder/decoder 430. The FEC decoded data is sent to the MAC layer module 460.

The maximum BER level of the decoded burst data is as specified for example by the network operator or the respective standard. The burst data sent from a specific ONU is FEC decoded based on the FEC code assigned to this ONU. The list of FEC codes assigned to different ONUs are saved in the memory 450. In one embodiment, the FEC encoder/decoder 430 is integrated in the PHY layer adapter 420. In another embodiment of the invention, the FEC encoder/decoder 430 can be also integrated in with MAC layer module 460.

The processor 410 is also configured to extract the measured BER of downstream frames as communicated by the ONUs. Using this information, the processor 410 may change the current downstream FEC code as described in detail above. The processor 410 may be realized as one or more central processing units or one or more application specific integrated circuits (ASICs). In one embodiment, the processor 410 is the network processor of the OLT.

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for an adaptive forward error correction (FEC) in a passive optical network (PON), the method comprising:
   selecting an initial downstream FEC code to be applied on downstream data transmitted from an optical line terminal (OLT) to a plurality of optical network units (ONUs) of the PON;
   communicating the selected downstream FEC code to the plurality of ONUs;
   receiving a downstream bit error ratio (BER) value from an ONU of the plurality of ONUs, wherein the downstream BER value is measured respective to downstream data received at the ONU;
   comparing the received downstream BER value to a previously received downstream BER value;
   changing the selected initial downstream FEC code to a new downstream FEC code, the new downstream FEC code being a weaker downstream FEC code when the received downstream BER value is less than the previously received downstream BER value and to a stronger downstream FEC code when the received downstream BER value is greater than the previously received downstream BER value, the stronger downstream FEC code being characterized as correcting more errors in the downstream data than the weaker downstream FEC code; and
   communicating the new downstream FEC code to the plurality of ONUs.

2. The method of claim 1, further comprising:
   changing the new downstream FEC code to a different FEC code when the downstream BER value has been changed.

3. The method of claim 1, wherein the selecting comprises:
   selecting the initial downstream FEC code based on at least a topology of the PON.

4. The method of claim 1, wherein the communicating downstream FEC codes comprises:
   using handshake messages periodically sent to the plurality of ONUs.

5. The method of claim 1, further comprising:
   determining an upstream FEC mode of the ONU;
   selecting an upstream FEC code when the ONU is in an upstream FEC-enabled mode;
   communicating the selected upstream FEC code and the upstream FEC mode to the ONU;
   measuring an upstream BER value of upstream burst data transmitted by the ONU;
   changing the selected upstream FEC code to a new upstream FEC code based on the upstream BER value; and
   communicating the new upstream FEC code to the ONU.

6. The method of claim 5, further comprising:
   setting the new upstream FEC code to a different FEC code when the upstream BER value measured for the upstream FEC code is changed.

7. The method of claim 6, wherein the changing the selected upstream FEC code comprises:
   setting the new upstream FEC code to a stronger upstream FEC code when the upstream BER value is higher than at least one of: a maximum allowable upstream BER value and a previously measured upstream BER value,
   wherein a weaker upstream FEC code is set for the new upstream FEC code when the BER value is lower than the previously measured upstream BER value, and
   wherein the stronger upstream FEC code is characterized as correcting more errors than the weaker upstream FEC code.

8. The method of claim 5, wherein the communicating the new upstream FEC code to the ONU comprises:

communicating the new upstream FEC code using at least one of: a vendor specific downstream ONU management and control interface (OMCI) message, out of band handshake messages and a downstream unicast physical layer operations and maintenance (PLOAM) message.

9. The method of claim 5, wherein the PON comprises a ten-Gigabit PON (XG-PON).

10. The method of claim 9, wherein the downstream FEC code or the upstream FEC code comprises:
a FEC code not defined in a communication standard of the XG-PON.

11. The method of claim 10, wherein the downstream FEC code comprises:
an RS(248,216) code.

12. The method of claim 10, wherein the upstream FEC code comprises:
an RS(248,232) code.

13. The method of claim 9, further comprising:
encapsulating the downstream data in a XG-PON1 downstream physical (PHY) frame having a fixed length of 125 microseconds.

14. An optical line terminal (OLT) for performing an adaptive forward error correction (FEC) in a passive optical network (PON), the OLT comprising:
a processor configured:
to set a downstream FEC code and a upstream FEC code based on a measured downstream bit error rate (BER) value and a measured upstream BER value, respectively,
to compare the measured downstream BER value to a previously measured downstream BER value and the measured upstream BER value to a previously measured upstream BER value, and
to change the set downstream FEC code and the upstream downstream FEC code to a new downstream FEC code and a new upstream FEC code, respectively, the new downstream FEC code and the new upstream FEC code being a weaker downstream FEC code when the downstream BER value is less than the previously measured downstream BER value and a weaker upstream FEC code when the upstream BER value is less than the previously measured upstream BER value, respectively, or to a stronger downstream FEC code when the downstream BER value is greater than the previously measured downstream BER value and a stronger upstream FEC code when the upstream BER value is greater than the previously measured upstream BER value, respectively, the stronger downstream FEC code and the stronger upstream FEC code being characterized as correcting more errors than the weaker downstream FEC code and the weaker upstream FEC code, respectively,
a FEC encoder/decoder configured:
to encode downstream data for transmission to an optical network unit (ONU) in accordance with the new downstream FEC code, and
to decode upstream data received from the ONU accordance with the new upstream FEC code; and
a memory configured to store a list of FEC codes that can be set for the upstream FEC code and the downstream FEC code.

15. The OLT of claim 14, further comprising:
a physical layer adapter configured:
to assemble downstream physical frames to be sent to the ONU, and
to de-assemble upstream physical frames received from the ONU, wherein the downstream physical frames and the upstream physical frames are compliant with a communication standard of the PON.

16. The OLT of claim 15, wherein the PON is at least a ten-Gigabit PON (XG-PON), and
wherein the list of FEC codes includes a FEC code not defined in the communication standard of the PON.

17. A non-transitory computer readable medium having stored thereon instructions, that when executed, cause a processor to perform an adaptive forward error correction (FEC) in a passive optical network (PON), comprising:
selecting an initial downstream FEC code to be applied on downstream data transmitted from an optical line terminal (OLT) to a plurality of optical network units (ONUs) of the PON;
communicating the selected downstream FEC code to the plurality of ONUs;
receiving a downstream bit error ratio (BER) value from an ONU of the plurality of ONUs, wherein the downstream BER value is measured respective to downstream data received at the ONU;
comparing the received downstream BER value to a previously received downstream BER value;
changing the selected initial downstream FEC code to a new downstream FEC code, the new downstream FEC code being a weaker downstream FEC code when the received downstream BER value is less than the previously received downstream BER value and to a stronger downstream FEC code when the received downstream BER value is greater than the previously received downstream BER value, the stronger downstream FEC code being characterized as correcting more errors in the downstream data than the weaker downstream FEC code; and
communicating the new downstream FEC code to the plurality of ONUS.

* * * * *